(12) United States Patent
Aggarwal et al.

(10) Patent No.: US 11,461,163 B1
(45) Date of Patent: Oct. 4, 2022

(54) REMOTE DEVICE ERROR CORRECTION

(71) Applicant: Amazon Technologies, Inc., Seattle, WA (US)

(72) Inventors: Piyush Aggarwal, Seattle, WA (US); Ravishankar Bhagavandas, Bothell, WA (US); Albert Daniel Prego, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 321 days.

(21) Appl. No.: 16/457,525

(22) Filed: Jun. 28, 2019

(51) Int. Cl.
*G06F 11/07* (2006.01)
*G06F 8/65* (2018.01)

(52) U.S. Cl.
CPC ............ *G06F 11/0793* (2013.01); *G06F 8/65* (2013.01); *G06F 11/0709* (2013.01)

(58) Field of Classification Search
CPC ..... G06F 11/0793; G06F 8/65; G06F 11/0709
See application file for complete search history.

(56) References Cited

U.S. PATENT DOCUMENTS

| | | | | |
|---|---|---|---|---|
| 6,892,317 | B1 * | 5/2005 | Sampath | G06F 11/25 714/4.3 |
| 9,069,737 | B1 * | 6/2015 | Kimotho | G06F 11/0793 |
| 9,183,072 | B1 * | 11/2015 | Makuch | G06F 11/0748 |
| 9,471,536 | B1 * | 10/2016 | Marr | G06F 9/44505 |
| 10,303,533 | B1 * | 5/2019 | Panov | G06F 11/3452 |
| 10,552,249 | B1 * | 2/2020 | Johansson | G06F 11/0751 |
| 2012/0290870 | A1 * | 11/2012 | Shah | G06F 21/575 714/4.11 |
| 2014/0310222 | A1 * | 10/2014 | Davlos | G06F 11/2294 706/46 |
| 2017/0139762 | A1 * | 5/2017 | Sherlock | G06F 11/0709 |
| 2018/0095814 | A1 * | 4/2018 | Patil | G06F 11/0709 |
| 2018/0189130 | A1 * | 7/2018 | Mowry | G06F 11/0781 |
| 2019/0227876 | A1 * | 7/2019 | Dardis | G06F 8/71 |
| 2019/0296989 | A1 * | 9/2019 | Racine | G06N 20/00 |
| 2019/0324893 | A1 * | 10/2019 | Vaishnav | G06N 20/00 |
| 2020/0133755 | A1 * | 4/2020 | Bansal | G06F 11/079 |
| 2020/0210268 | A1 * | 7/2020 | Nuthi | G06F 11/0772 |
| 2020/0285457 | A1 * | 9/2020 | Meriac | G06F 8/654 |

OTHER PUBLICATIONS

Wikipedia, "IEEE 802.11," page last modified Feb. 7, 2017, retrieved Feb. 13, 2017, from https://en.wikipedia.org/wiki/IEEE_802.11, 9 pages.

* cited by examiner

*Primary Examiner* — Bryce P Bonzo
*Assistant Examiner* — Michael Xu
(74) *Attorney, Agent, or Firm* — Davis Wright Tremaine LLP

(57) ABSTRACT

A method and system for correcting embedded device errors. The method may include receiving a first log generated by a first device though a first channel, receiving a second log generated by the first device that identifies a malfunction of the first device through a second channel, determining a corrective action to cause the first device to cease the malfunction, based at least in part on the second log and an inference model, and sending a message to a second device based at least in part on the corrective action.

18 Claims, 5 Drawing Sheets

REMOTE DEVICE ERROR CORRECTION

BACKGROUND

The "Internet of Things" (hereinafter referred to as "IoT") includes one or more embedded devices communicating within the Internet infrastructure. These embedded devices (also referred to herein as "IoT devices") may communicate together to perform various functions such as collecting sensor data and modifying configurations of a device such as a thermostat or lightbulb. Accordingly, IoT results in new, wide-ranging types of applications in which virtually any type of physical object can be configured to provide information about itself or its surroundings and/or may be controlled remotely via client devices over the Internet. For example, the IoT devices may include physical objects such as lightbulbs, thermostats, and fans for a facility. To maintain portability and scalability, the IoT devices are typically designed to have limited functionalities and to connect to other devices using short range network channels such as Bluetooth Low Energy and/or WiFi. In many cases, the IoT devices are unable to connect directly to the Internet and need to be connected to one or more hub devices that can connect to the Internet on behalf of the IoT devices and/or manage operations for the IoT devices.

Many types of errors and malfunctions arise during the deployment and operation of IoT devices. In various situations, these errors and malfunctions may include not being able to connect to the Internet, not being able to receive or install a firmware and/or software update, not having the appropriate permissions or credentials to access a computing resource or service, having a connectivity problem with a router or a hub device, and many other types of errors. In many situations, the errors experienced by IoT devices involve individual correction after a cumbersome troubleshooting process that requires extensive human involvement, and that in some cases requires human-to-human communication between a first person responsible for, and with access to, a deployed IoT device, and a second person with domain specific knowledge regarding technical aspects of the deployed IoT device and its network environment. This approach is difficult and inefficient, results in undue IoT device downtime, and does not scale to large collections of connected IoT devices.

BRIEF DESCRIPTION OF THE DRAWINGS

Various techniques will be described with reference to the drawings, in which.

DETAILED DESCRIPTION

Figure 1:
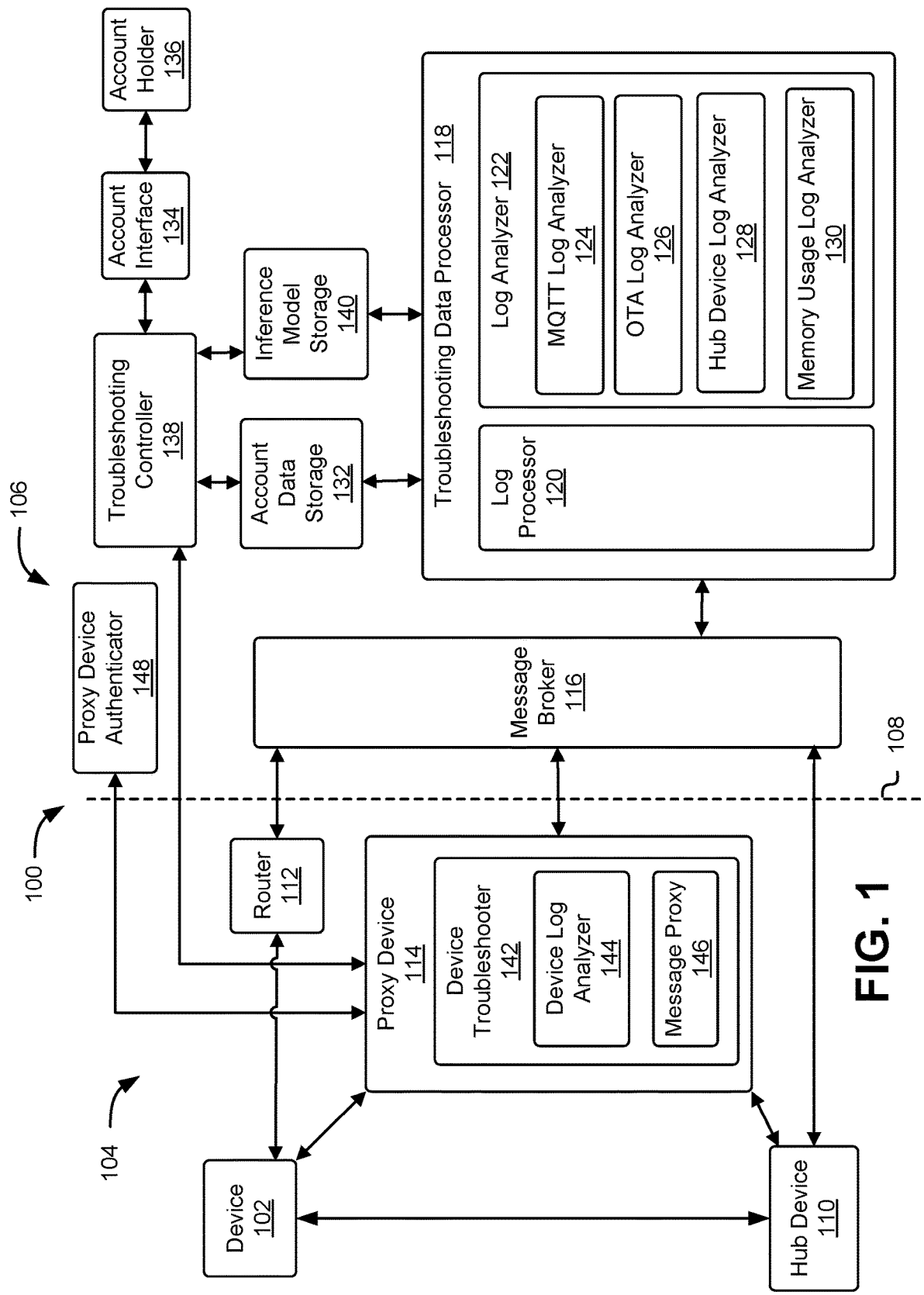
FIG. 1 illustrates an example diagram of a network environment in which logs generated by a device in a malfunctioning state are analyzed to correct the malfunction in accordance with an embodiment.

Techniques described and suggested herein relate to troubleshooting and correction of errors experienced by IoT devices. In an example, an IoT device running a real-time operating system (RTOS) may generate logs with a format that allows an error identifier to be included in a log when the IoT device experiences a malfunction. The IoT device may be deployed, possibly with other IoT devices, in a device environment, and may be in data communication with computer systems and/or services deployed in a computer resource service provider (e.g., a cloud computing services provider) environment, also referred to herein as a "cloud environment". In some cases, the IoT device may periodically generate logs and send them to a message broker running in the service provider environment. The cloud environment may include a troubleshooting service with a log processor and a log analyzer running in a data plane. The troubleshooting service may store the received logs in an account data storage portion of a data repository, and may determine whether further action is required with respect to the received logs. In some cases, the troubleshooting service may identify a log as being a log that requires further action based on an error identifier in the log that identifies a malfunction of the IoT device, and the troubleshooting service may determine a corrective action that causes the IoT device to cease the malfunction. In an example, the log analyzer may determine the corrective action based at least in part on an inference model and the error identifier. In some embodiments, the inference model may be an inference model previously generated through a machine learning technique. In some embodiments, the inference model may be an artificial neural network, a support vector machine, a Bayesian inference model, a statistical model, or any other suitable inference model or combination of models. The troubleshooting service may send a message to the IoT device based on the corrective action that may cause the IoT device to execute a corrective action such as installing a firmware update or a digital signature that corrects the identified error, and may cause the IoT device to generate state information and/or a log associated with execution of the corrective action.

In an example, the IoT device may send logs to the message broker of the cloud environment via a router (e.g., a WiFi router) or a hub device during normal operation of the IoT device. In the event of a malfunction relating to connectivity between the IoT device and the router or hub device, the IoT device may generate a log that includes an error identifier indicating the connectivity problem, and the IoT device may attempt to connect to a proxy device (e.g., a smartphone, tablet computer, or laptop computer) operating in the device environment. In an example, the IoT device may have been previously paired with the proxy device, and may automatically connect through a communication technique such as Bluetooth Low Energy (BLE). In an example, a user of the proxy device may initiate the connection with the IoT device if the proxy device had not been previously paired or associated with the IoT device. After the IoT device is connected to the proxy device, the IoT device may send the log to the proxy device.

In an example, the proxy device may determine whether to perform an analysis of the log locally, or whether to send the log to the troubleshooting service in the cloud environment for further analysis. If the proxy device determines that it has sufficient local resources to analyze the log, it may determine a corrective action based on the error identifier and an inference model. If the proxy device determines to send the log to the troubleshooting service, the proxy device may send the log to a message broker in the cloud environment that routes the log to the troubleshooting service. The proxy device may receive data corresponding to a corrective action from the troubleshooting service in response to the sent log. The proxy device may then send data to the IoT device based on the corrective action that was determined locally, or by the troubleshooting service. In an example, the data sent to the IoT device may cause the IoT device to execute a corrective action such as installing a firmware update or a digital certificate.

In an example, an account holder may interact with a control plane of the troubleshooting service operating in the cloud environment through an account interface. The account holder may have access to a portion of a data repository that may include account data storage and inference model storage associated with an IoT device associated with the account holder. In an example, the logs may include an account identifier, a device identifier that can be mapped to an account by the troubleshooting service, or some other identifier that can be mapped to an account by the troubleshooting service. In an example, the account holder may be able to inspect and/or retrieve logs in the account data storage and/or may be able to store, update, and/or change inference models in the inference model storage. In an example, the account holder and/or systems associated with the account holder may be able to communicate with the proxy device via the account interface and the control plane of the troubleshooting service.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages. For example, some embodiments may reduce IoT device downtime in a networked environment. Some embodiments may improve the security of IoT device troubleshooting and error correction by routing troubleshooting data, including logs and data to cause the execution of corrective actions through a trusted proxy device. Some embodiments may further improve IoT device security and network connectivity by transmitting firmware updates, digital certificates, and other data associated with corrective actions to the IoT device in response to analyzing a log based at least in part on an error identifier. Some embodiments may improve IoT initial device side setup processes by automatically correcting connection errors and/or other types of errors. It will be appreciated that this list of advantages is intended to be illustrative and is not exhaustive of possible advantages that can be achieved in light of this disclosure.

FIG. 1 illustrates an example diagram of a network environment 100 in which logs generated by a device 102 in a malfunctioning state are analyzed to correct the malfunction in accordance with an embodiment. In an embodiment, the network environment 100 may include a device environment 104 and a service provider environment 106. In some embodiments, the service provider environment 106 may provide one or more online services such as a troubleshooting service, a data aggregation service, a processing service, etc. A dashed line 108 is shown to more clearly illustrate devices that may be considered to be a part of the device environment 104, and devices that may be considered to be a part of the service provider environment 106, in accordance with an embodiment. In an embodiment, one or more devices of the device environment 104 may be in data communication with one or more devices of the service provider environment 106 over one or more networks (not shown for clarity) across the dashed line 108, which may include the Internet and/or any combination of wired and wireless networks. Additionally, in various embodiments, any components of the device environment 104 and/or the service provider environment 106 may be coupled with any other components of the device environment 104 and/or the service provider environment 106 via any combination of wired and/or wireless networks, including cellular wireless networks.

In an embodiment, the device environment 104 may include the device 102. In some embodiments, the device 102 may be an IoT device that includes a microcontroller, memory, non-transitory computer-readable instructions that cause the IoT device to perform operations described with respect to the device 102, a wireless data transmitter, a wireless data receiver, and one or more sensors and/or actuators (not shown for clarity). In an embodiment, the device 102 may generate logs while running a real-time operating system. In an embodiment, the device environment 104 may include a hub device 110 that may act as an intermediary and/or proxy device between the device 102 and one or more systems of the service provider environment 106. Although a single device 102 is shown for clarity, it should be understood that the device environment 104 may include additional IoT devices in some embodiments. In some embodiments, the hub device 110 may be an edge computing device and/or may include a processor, memory, data storage, and non-transitory computer-readable instructions to perform operations described with respect to the hub device 110. In some embodiments, the device 102 may communicate with the hub device 110 through a WiFi connection, a BLE connection, or any other suitable connection.

In some embodiments, the logs generated by the device 102 may be transmitted by the device 102 to the service provider environment 106. In some embodiments, the logs may be transmitted in the form of messages using a publish-subscribe-based messaging protocol such as Message Queuing Telemetry Transport (MQTT). A different messaging protocol may be used in other embodiments (e.g., HyperText Transfer Protocol (HTTP)). Merely as an example, the logs may have a format of: [LOG SEQUENCE NUMBER] [DEBUG|INFO|ERROR WARN|CRITICAL] [MODULE] [LOG STRING]. For example, a log may be: [1000] [ERROR] [WIFI] [Failed to connect to Access Point XXXX]. In this example, the log has a log sequence number of 1000 and indicates an error associated with the WiFi module of the device that involves a failure to connect to an access point designated as XXXX. In some embodiments, the sequence number may be used to track the order of the logs. In other embodiments, the order of the logs could be tracked through a timestamp included in the logs, although a timestamp is not required and may not have a position in the log format, such as in the example log format presented above. In some embodiments, the log may include an error code field, or the device 102 may generate an error code that is placed in the LOG STRING field, where a particular error code represents a particular error. In some embodiments, the device 102 may include a logs and metrics library, not shown for clarity, that includes instructions that, when executed by a RTOS running on the device 102, cause the device 102 to generate and transmit the logs. In some embodiments, the logs may include one or more metrics relating to one or modules of the device 102 (e.g., a WiFi module, memory module, sensor module, and/or any other suitable module). In some embodiments, many different types of errors may cause the device 102 to include an error flag and/or an error code in the log. For example, the device 102 may be an IoT lightbulb that allows wireless control, and the error may be that the IoT lightbulb is not able to be turned on and/or off by a smart watch, or the device 102 may be a smart watch that is not able to turn the IoT lightbulb on and/or off. Another error may be caused when the device 102 is a smart watch that is not functioning properly after a software or firmware update. In some embodiments, the error may be some type of connection failure, such as an endpoint connection failure or a connection failure due to an invalid certificate, missing certificate, incorrect network address, insufficient permission level, or some other reason.

In some embodiments, the logs and metrics library may also cause the device 102 to maintain a circular buffer to store incoming logs from various modules of the device 102. In some embodiments, when the device 102 malfunctions, a window of logs in the buffer, that may include preceding logs and/or succeeding logs in addition to a log that identifies an error, may be sent to a proxy device and/or a troubleshooting service. In some embodiments, the logs and metrics library may also cause the device 102 to maintain a connection precedence order for sending the logs. In some embodiments, the connection precedence order may be, in order of priority with highest first: wired Ethernet, WiFi, Bluetooth Low Energy, Standard Bluetooth, wired serial (e.g., Universal Serial Bus (USB), Serial Peripheral Interface (SPI), Inter-Integrated Circuit (I2C) Bus). However, a different connection precedence order and/or a connection precedence order having other connection techniques may be used in other embodiments. In some embodiments, if the device 102 is connected to a cloud environment over Transmission Control Protocol/Internet Protocol (TCP/IP), such as over an Ethernet or WiFi connection, the device 102 may send logs directly to an MQTT topic. If there is a connection failure, such as due to an invalid certificate or endpoint connection failure, an alternate connection mechanism may be used.

In an embodiment, the device environment 104 may include a router 112. In some embodiments, the router 112 may be a wireless router such as a WiFi router that conforms to one or more Institute of Electrical and Electronics Engineers (IEEE) 802.11 standards. In an embodiment, the device 102 may communicate with the service provider environment 106 through the router 112. However, it should be understood that the device 102 may communicate with the service provider environment 106 through any suitable combination of wired and/or wireless networking components, and that the router 112 may not be present in some embodiments. In an embodiment, the device environment may include a proxy device 114 that may act as a proxy device and/or intermediary between the device 102 and one or more systems of the service provider environment 106. In an embodiment, the proxy device 114 may be a mobile communications device such as a smartphone. In other embodiments, the proxy device 114 may be some other type of device, such as a tablet device, a laptop computer, a notebook computer, or a desktop computer. The proxy device 114 may include a processor, memory, data storage, and wireless and/or wired communication network controllers in some embodiments. The proxy device 114 may include non-transitory computer-readable instructions to perform operations described with respect to the proxy device 114 and components thereof (e.g., device troubleshooter 142). In some embodiments, the device 102 may attempt to connect automatically to the proxy device 114 after experiencing a connection failure associated with connection to the service provider environment 106, the router 112, or the hub device 110. In some embodiments, the hub device 110 and/or the proxy device 114 may communicate with the service provider environment 106 through the router 112, and/or one or more other networking components, not shown for clarity.

In an embodiment, the service provider environment 106 may include a message broker 116 that may route messages to and from the device 102 through the hub device 110, the router 112, and/or the proxy device 114. In some embodiments, the message broker 116 may be a MQTT message broker that routes messages based at least in part on MQTT topics identified by the messages. The message broker may be a computer system that includes one or more processors, memory, and non-transitory computer-readable instructions to perform operations described with respect to the message broker 116. In some embodiments, messages from the device environment 104 may pass to and/or from the service provider environment 106 using some other type of message routing such as through a message server or any other suitable type of message routing.

In various embodiments, a troubleshooting data processor 118 may be in data communication with the message broker 116. In some embodiments, the troubleshooting data processor 118 may include a log processor 120 and a log analyzer 122. In some embodiments, the log analyzer 122 may include a plurality of log analyzers to analyze different types of logs and/or logs from different types of devices. In some embodiments, the log analyzer 122 may include a MQTT log analyzer 124, an over-the-air (OTA) log analyzer 126, a hub log analyzer 128, and a memory log analyzer 130. In some embodiments, the log processor 120 may listen to MQTT topics relating to messages received by the message broker 116 from the device 102. In some embodiments, the troubleshooting data processor 118 may run in a data plane of a troubleshooting service of the service provider environment 106.

The troubleshooting data processor 118 may be a computer system that includes one or more processors, memory, and non-transitory computer-readable instructions to perform operations described with respect to the troubleshooting data processor 118 and/or components thereof. In some embodiments, the troubleshooting data processor 118 or one or more components thereof (e.g., log analyzer 122) may be implemented as an application specific integrated circuit (ASIC). The log processor 120 and/or the log analyzer 122 may be software modules described by the instructions of the troubleshooting data processor 118 and run by the one or more processors of the troubleshooting data processor 118. In other embodiments, the log processor 120 and/or the log analyzer 122 may include their own processor, memory, and computer readable instructions. In some embodiments, the MQTT log analyzer 124, the OTA log analyzer 126, the hub log analyzer 128, and the memory usage log analyzer 130 are software modules that run as sub-modules of the log analyzer 122. In other embodiments, one or more of the MQTT log analyzer 124, the OTA log analyzer 126, the hub log analyzer 128, and the memory usage log analyzer 130 may be separate computer systems that include one or more processors, memory, instructions to perform log analysis operations, and/or data storage.

In an embodiment, the service provider environment 106 may include account data storage 132 and an account interface 134 to provide access to an account holder 136 to the account data storage 132. In an embodiment, the account holder 136 may access the account data storage 132 via a troubleshooting controller 138. In some embodiments, the troubleshooting controller 138 may run in a control plane of a troubleshooting service of the service provider environment 106. The troubleshooting controller 138 may be a computer system that includes one or more processors, memory, and non-transitory computer-readable instructions to perform operations described with respect to the troubleshooting controller 138. In some embodiments, the account holder 136 may be a computer system of a cloud computing services customer (e.g. an original equipment manufacturer (OEM) of the device 102 or a product-based company that manufactured or is otherwise associated with the device 102), operating in a different environment than the service provider environment 106. In some embodiments, the account holder 136 may be in data communication with the account interface 134 through a network, not shown for clarity. In some embodiments, the account holder 136 may communicate with the proxy device 114 via the account interface 134 and the troubleshooting controller 138. In some embodiments, a representative of the account holder 136 may operate a computer system of the account holder 136 via a user interface to access account data storage 132 and/or inference model storage 140, and may communicate with the proxy device 114 via the account interface 134 and the troubleshooting controller 138.

In some embodiments, the troubleshooting data processor 118 may include a voice analyzer, not shown for clarity, which may take voice input from a user of the proxy device 114 to determine a device identifier associated with the device 102 and/or to determine additional information associated with an error of the device 102. In some embodiments, the troubleshooting data processor 118 may analyze one or more logs based at least in part on the voice input to determine a corrective action. In some embodiments, the troubleshooting data processor 118 may generate a troubleshooting approach based at least in part on the logs, and may communicate the troubleshooting approach to the proxy device 114 such that the proxy device 114 is caused to display the troubleshooting approach in text or graphical form, and/or to emit audio signals of synthesized or recorded speech based at least in part on the troubleshooting approach.

In an embodiment, the service provider environment 106 may include inference model storage 140. In some embodiments, the log processor 120 may associate logs from the device 102 with a customer identifier and/or a device identifier and store the logs in the account data storage 132 in association with the customer identifier and/or the device identifier. In some embodiments, the log analyzer 122 may analyze logs to diagnose issues associated with the device 102. In some embodiments, the log analyzer 122 may determine an inference based at least in part on an inference model and a log. In some embodiments, the log analyzer 122 may retrieve the inference model from the inference model storage 140 and may store the inference as a state of the inference model in the inference model storage 140. In some embodiments, the log analyzer may determine a corrective action to cause the device 102 to cease a malfunction, based at least in part on the determined inference. In some embodiments, the account holder 136 may store one or more inference models in the inference model storage 140 via the account interface 134, and/or may perform other actions via the account interface. In some embodiments, the account interface 134 is an application programming interface (API). In some embodiments, the account interface 134 is a graphical user interface (GUI).

In some embodiments, the proxy device 114 may include a device troubleshooter 142 that may include a device log analyzer 144 and a message proxy 146. In some embodiments, the device log analyzer 144 may include more than one type of log analyzer, such as one or more of the log analyzers described with respect to the log analyzer 122. In some embodiments, the device log analyzer 144 may analyze device logs from the device 102 when sufficient computing resources are available in the proxy device 114, and may forward the device logs to the message broker 116 using the message proxy 146 for further analysis by the log analyzer 122 when sufficient computing resources are not available in the proxy device 114. In some embodiments, the device troubleshooter 142 may be an application on the proxy device 114 that runs in association with a troubleshooting library that includes the device log analyzer 144 and/or the message proxy 146. In some embodiments, the hub device 110 may include a device troubleshooter similar to the device troubleshooter 142, and/or may perform one or more functions described with respect to the proxy device 114.

In some embodiments, the service provider environment 106 includes a proxy device authenticator 148 to authenticate communications from proxy devices (e.g., proxy device 114 and/or hub device 110). In some embodiments, the proxy device authenticator 148 authenticates communications from the proxy device 114 before the proxy device 114 is allowed access to the troubleshooting controller 138. In some embodiments, the proxy device authenticator 148 may also authenticate communications to the message broker 116 from one or more devices in the device environment 104 (e.g. hub device 110 and/or proxy device 114). The proxy device authenticator 148 may be a computer system that includes one or more processors, memory, and non-transitory computer-readable instructions to perform operations described with respect to the proxy device authenticator 148. In some embodiments, the proxy device authenticator may be an authentication layer of a controller interface for the troubleshooting controller 138. In some embodiments, the proxy device 114 may send an authentication request to the proxy device authenticator 148 and receive an authentication confirmation from the proxy device authenticator 148 in response to the request, before the proxy device 114 sends one or more communications to the troubleshooting controller 128 and/or the message broker 116.

Figure 2:
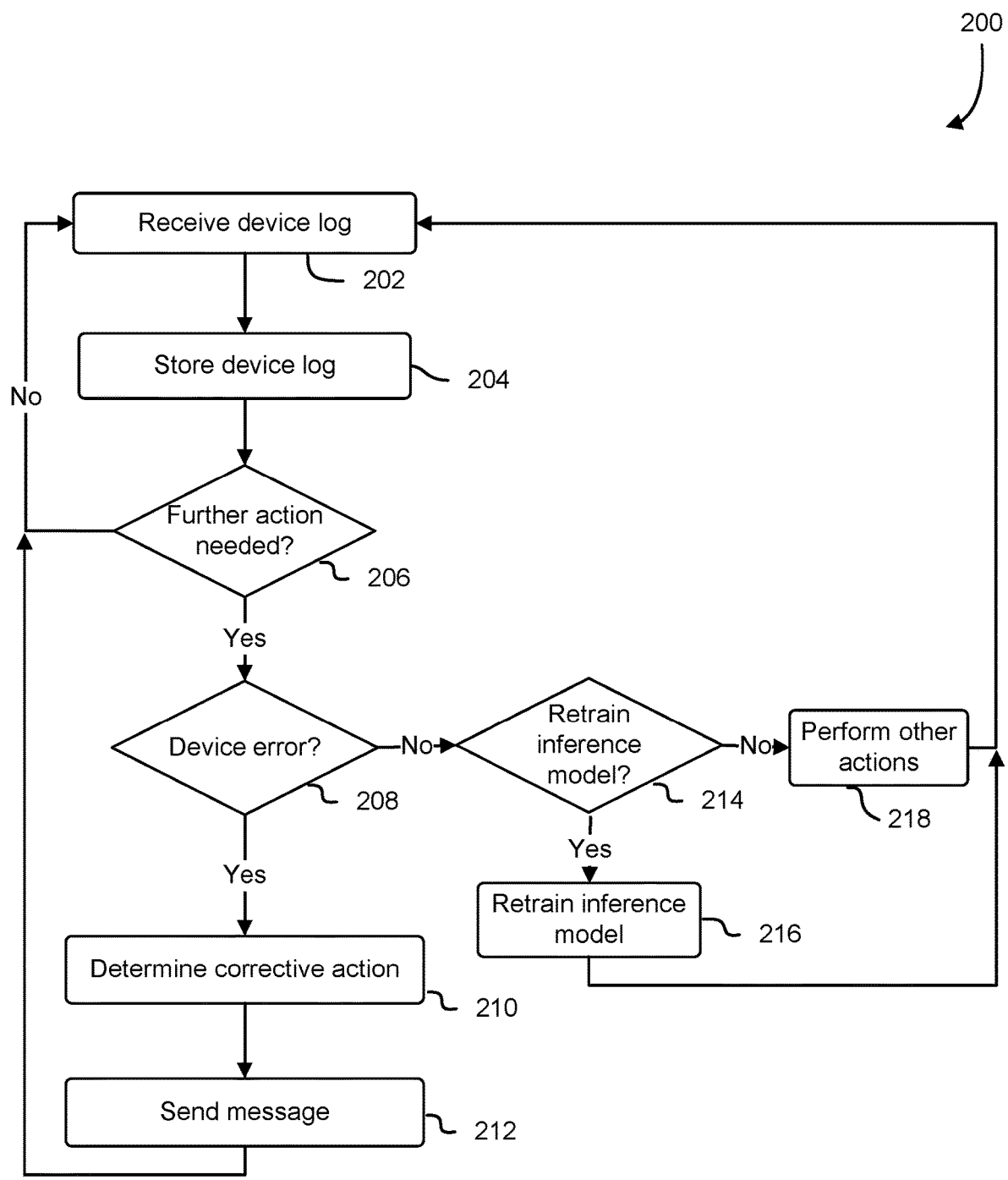
FIG. 2 illustrates an example flowchart for troubleshooting a device error in accordance with an embodiment.

FIG. 2 illustrates an example flowchart of a process 200 for troubleshooting a device error in accordance with an embodiment. In an embodiment, the process 200 may include receiving a log at a block 202. In an embodiment, the log may be generated by the device 102 and received by the service provider environment 106 (e.g., by the message broker 116). In some embodiments, the log may be received from the device 102 through one of a plurality of different transmission paths, which are also referred to as channels herein. For example, the log may be received through a first channel via the router 112, a second channel via the proxy device 114, or a third channel via the hub device 110. In some embodiments, the log may be stored at a block 204. In some embodiments, storing the log at the block 204 may include storing the log in association with a customer account in a data repository (e.g., in a portion of account data storage 132 associated with an account identifier of account holder 136). In some embodiments, message broker 116 may route the log to the log processor 120, and the log processor 120 may store the log in account data storage 132. In some embodiments, storing the log in association with the customer account may include pooling the log with previously stored logs by storing a log received through a second channel in association with a log previously received through a first channel. In some embodiments, storing the log may include storing the log in association with a device identifier (e.g., an identifier associated with the device 102) and/or a device environment identifier (e.g., an identifier associated with the device environment 104).

In some embodiments, the process 200 may include determining, at a decision block 206, whether further action is needed. In some embodiments, the log analyzer 122 may determine whether further action is needed based at least in part on the log. In some embodiments, the log analyzer 122 may identify the log as being a log that requires further action based at least in part on one or more identifiers in the log. In various embodiments, the one or more identifiers may include an error identifier, a retraining identifier, a message type identifier, and/or any other suitable identifier. In some embodiments, determining whether further action is needed may include parsing the log to extract the one or more identifiers (e.g., with the log processor 120 or the log analyzer 122).

If, at the decision block 206, it is determined that further action is needed, the process 200 may include determining whether a device error is indicated that requires further action at a decision block 208. In some embodiments, determining whether a device error is indicated may be performed by the log analyzer 122. In some embodiments, determining whether a device error is indicated may be based at least in part on an error identifier in the log that identifies a malfunction of the device that generated the log (e.g., device 102). In some embodiments, determining whether a device error is indicated may include parsing the log to extract one or more error identifiers (e.g., with the log processor 120 or the log analyzer 122).

If, at the decision block 208, it is determined that a device error is indicated, the process 200 may include determining a corrective action at a block 210. In some embodiments, the log analyzer 122 may determine the corrective action based at least in part on an inference model and the error identifier. In some embodiments, the error identifier may be an error code, a string in the LOG STRING field of the log, any other suitable error identifier extracted from the log, or a combination thereof. In some embodiments, determining the corrective action may be based at least in part on a module identified in the MODULE field of the log. In some embodiments, determining the corrective action may include selecting a log analyzer from a plurality of log analyzers to analyze the log. In some embodiments, if the log is received as a MQTT message transmission, selecting the log analyzer may include selecting the MQTT log analyzer 124. In some embodiments, determining the corrective action may include determining an inference by using at least the error identifier from a first log, and one or more data elements from a second log as inputs to the inference model. In some embodiments, determining a corrective action at the block 210 may include determining to send a message that will cause the device that generated the log to cease malfunctioning. In some embodiments, determining the corrective action may include determining the corrective action based at least in part on using a device state indicator as an input to the inference model. In some embodiments, the device state indicator may indicate a firmware version running on the device 102 when the log was generated, a software version running on the device 102, an operating status of the device 102, or some other state of the device 102. In some embodiments, the device state indicator may be included in the log. In some embodiments, the device state indicator may be retrieved from the data repository, and may represent a last known state of the device 102.

In some embodiments, at a block 212, the process 200 may include sending a message based at least in part on the corrective action. In various embodiments, the message may be sent by the troubleshooting data processor 118 to the device 102 through the message broker 116. In some embodiments, the message may be sent to the device 102 via the proxy device 114 or the hub device 110. In some embodiments, the corrective action may be to send a firmware update, software update, software patch, network configuration data (e.g., one or more network addresses), and/or a digital certificate to the device 102. In some embodiments, the process 200 may return to the block 202 where one or more additional logs may be received.

If, at the decision block 208, it is determined that a device error is not indicated, the process 200 may include determining whether to retrain an inference model at a decision block 214. In some embodiments, determining that an inference model should be retrained at the block 214 occurs after one or more corrective actions have been determined at the block 210 in one or more previous passes through the process 200. In some embodiments, determining whether to retrain an inference model may be based at least in part on one or more indicators in the log received at the block 202. In some embodiments, the log analyzer 122 may determine whether to retrain an inference model. If, at the decision block 214, it is determined to retrain an inference model, the process 200 may include retraining an inference model at a block 216. In some embodiments, retraining the inference model may be based at least in part on a corrective action determined at the block 210 with respect to a log previously received at the block 202. In some embodiments, retraining the inference model may be based at least in part on an indication that the previously determined corrective action was successful (e.g., with a device state identifier and/or one or more log data elements that indicate the corrective action was successful). In some embodiments, retraining the inference model may be based at least in part on an indication that the previously determined corrective action was unsuccessful (e.g., with a device state identifier and/or one or more log data elements that indicate the corrective action was unsuccessful). In some embodiments, retraining the inference model is performed by a retraining module (not shown for clarity) running on one or more processors of the troubleshooting data processor 118. In some embodiments, determining a corrective action at the block 210 may be based at least in part on the retrained inference model when a device error requiring further action is indicated after the inference model has been retrained. If, at the decision block 214, it is determined not to retrain an inference model, the process 200 may include performing other actions at a block 218. In some embodiments, the process 200 may return to the block 202 where one or more additional logs may be received.

Figure 3:
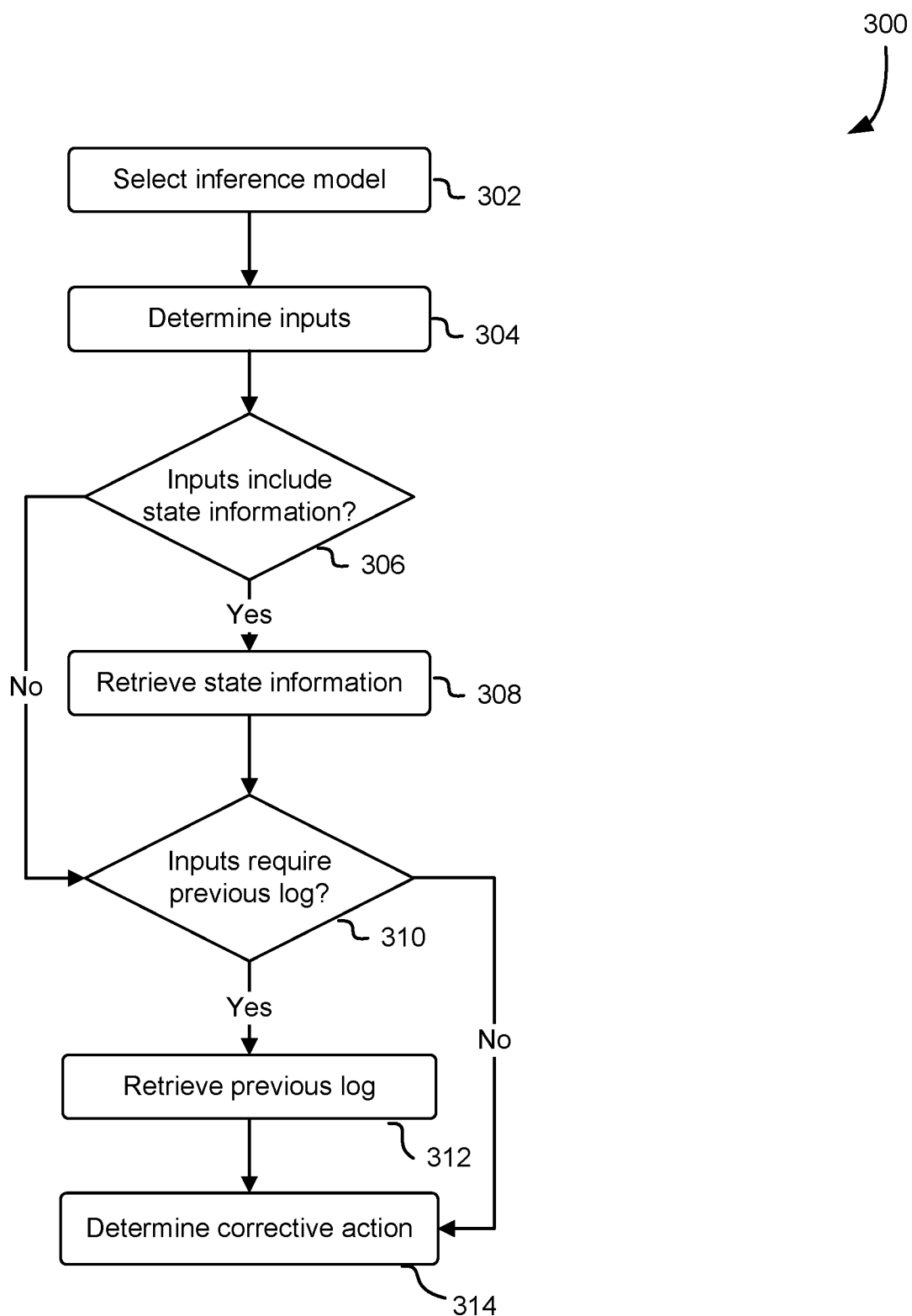
FIG. 3 illustrates an example flowchart for determining a corrective action in accordance with an embodiment.

FIG. 3 illustrates an example flowchart of a process 300 for determining a corrective action in accordance with an embodiment. In some embodiments, the log analyzer 122 described with respect to FIG. 1 performs the operations of the process 300. In some embodiments, one or more aspects described with respect to the process 300 may be included in determining the corrective action at the block 210 described with respect to FIG. 2. In some embodiments, the process 300 may include selecting an inference model at a block 302. In some embodiments, selecting the inference model may include retrieving the inference model (e.g., from inference model storage 140). In some embodiments, the inference model may be selected (e.g., by the log analyzer 122) based at least in part on a log (e.g., a log received from device 102 at the block 202). In some embodiments, the inference model may be selected from a plurality of inference models based at least in part on a device identifier, a device type identifier, an account identifier, an error identifier, and/or any other suitable data element.

In some embodiments, the process 300 may include determining the inputs for the selected inference model at a block 304. At a decision block 306, the process 300 may include determining whether the inputs include state information. In some embodiments, the state information may include one or more device state identifiers that identify a state of the device that generated the log. In some embodiments, the one or more device state identifiers may include a firmware version identifier that identifies the firmware version running on the device when the log was generated. In some embodiments, the one or more device state identifiers may identify a global state of the device 102 (e.g., the state of the device 102 in a finite state machine model of device 102 operation).

If, at the decision block 306, it was determined that the inputs include state information, the process 300 may include retrieving the state information at a block 308. In some embodiments, retrieving the state information may include parsing the log to extract the state information (e.g., a firmware version identifier). In some embodiments, retrieving the state information may include retrieving the state information from a data repository (e.g., account data storage 132) based at least in part on one or more data elements in the log (e.g., a device identifier and/or an account identifier), where the retrieved state information may be the last known installed firmware version and/or any other suitable device state information.

In some embodiments, the process 300 may include determining, at a decision block 310, whether the inputs require a previous log. If, at the decision block 310, it is determined that the inputs require a previous log, the process 300 may include retrieving the previous log at a block 312 in some embodiments. In some embodiments, the previous log may be retrieved from a data repository (e.g., account data storage 132). In various embodiments, the previous log may be retrieved based at least in part on one or more data elements in the log. In some embodiments, the previous log may be retrieved based at least in part on one or more of a device identifier, an account identifier, and a sequence identifier. In some embodiments, the process 300 may include determining a corrective action at a block 314 based at least in part on the inference model and inputs to the inference model.

Figure 4:
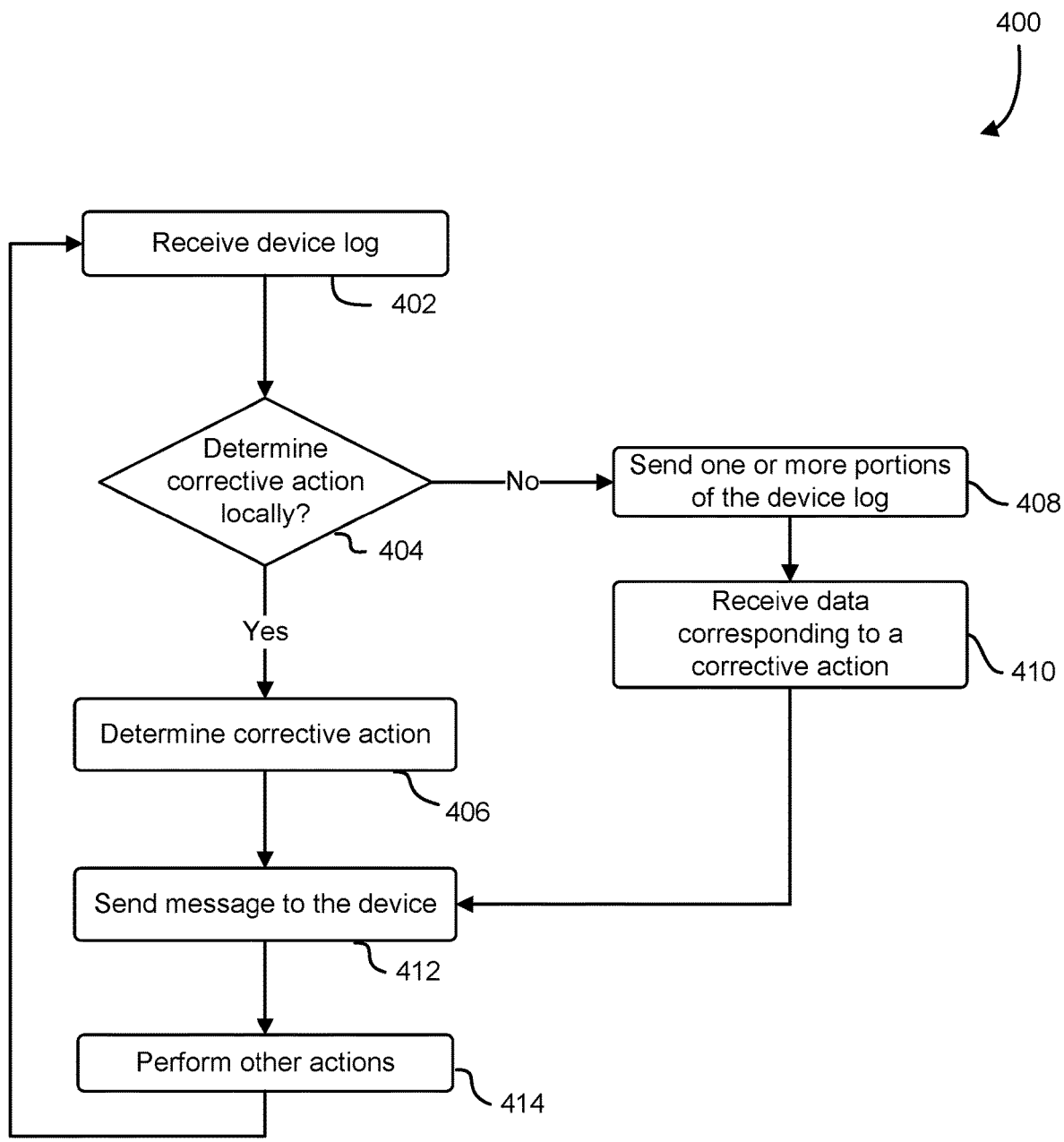
FIG. 4 illustrates an example flowchart for troubleshooting a device error with a proxy device, in accordance with an embodiment.

FIG. 4 illustrates an example flowchart of a process 400 for troubleshooting a device error with a proxy device (e.g., proxy device 114), in accordance with an embodiment. In some embodiments, the process 400 may include receiving a log at a block 402. In an embodiment, the log may be generated by the device 102 and received by the proxy device 114. In some embodiments, the device 102 may have been previously paired with the proxy device 114, and may automatically connect with the proxy device 114 through a communication technique such as BLE. In some embodiments, a user of the proxy device 114 may cause the proxy device 114 to initiate the connection with the device 102 via a user interface if the proxy device 114 had not been previously paired or associated with the device 102. At a decision block 404, the process 400 may include determining whether to determine a corrective action locally. In some embodiments, the operations of the decision block 404 are performed by the device log analyzer 144. In some embodiments, determining whether to perform the corrective action locally may be based at least in part on the log (e.g., an error identifier in the log). In some embodiments, determining whether to perform the corrective action locally may be based at least in part on determining whether one or more computer resources of the proxy device (e.g., processor type, available memory, availability of an inference model, and/or availability of inputs to an inference model such as previous logs or device state information) are sufficient to determine the corrective action.

If, at the decision block 404, it was determined to determine the corrective action locally, the process 400 may include determining a corrective action at a block 406. In some embodiments, operations of the block 406 are performed by the device log analyzer 144. In some embodiments, determining the corrective action may be performed in a similar manner to that described with respect to process 300, but the inference model and inputs to the inference model may be retrieved from local storage on the proxy device 114 rather than from account data storage 132 and inference model storage 140. In some embodiments, it may be determined to determine the corrective action locally at the decision block 404 even if one or more inputs to an inference model and/or the inference model itself are not currently available on the proxy device 114. In some embodiments, determining the corrective action at the block 406 may include determining whether an inference model and/or inputs to an inference model such as additional logs or device state information are required. If one or more additional items are needed (e.g., the inference model and/or the inputs to an inference model), determining the corrective action at the block 406 may include retrieving the one or more additional items from the service provider environment 106. In some embodiments, the proxy device 114 may retrieve an inference model from inference model storage 140 and/or inputs to an inference model such as additional logs, data elements from one or more logs, or device state information from the account data storage 132 (e.g., via the troubleshooting controller 138).

If, at the decision block 404, it was determined that the corrective action should not be determined locally, the process 400 may include sending one or more portions of the log, at a block 408, to another computer system for analysis (e.g., service provider environment 106). In some embodiments, the one or more portions of the log may be sent by the message proxy 146 of the proxy device 114 to the message broker 116. In some embodiments, the log may be sent using MQTT over a Web Socket protocol to the message broker 116, however it should be understood than any suitable protocol may be used in various embodiments. In some embodiments, a warning may be displayed on the proxy device 114 if the corrective action is not determined locally. In some embodiments, data corresponding to a corrective action may be received at a block 410 in response to the sent one or more portions of the log. In some embodiments, the data corresponding to the corrective action may be received by the proxy device 114 from the message broker 116.

In some embodiments, at a block 412, the process 400 may include sending a message to the device that generated the log (e.g., device 102), based at least in part on the determined corrective action at the block 406 or the data corresponding to a corrective action received at the block 410. In some embodiments, the message may include a firmware or software update that causes the device to cease malfunctioning. In some embodiments, the message may include a digital certificate that causes the device to have sufficient permissions to access one or more IoT services in a cloud computing environment (e.g., service provider environment 106). In some embodiments, the device troubleshooter 142 directs the proxy device 114 to send the message to the device 102. In some embodiments, at a block 414, the process 400 may include performing other actions (e.g., sending a corrective action taken indicator in association with the log from the proxy device 414 to the message broker 116). In some embodiments, performing other actions at the block 414 may include receiving an indication of whether the corrective action was successful from the service provider environment 106 (e.g., from the log processor 120 or the log analyzer 122). In some embodiments, the indication may be automatically generated by the troubleshooting data processor 118 and provided to the proxy device 114 after a successful reconnection of the device 102 to the service provider environment 106 (e.g., to message broker 116) via a communication channel that does not include the proxy device 114. In some embodiments, the indication of whether the corrective action was successful may be a device state indicator for the device 102. In some embodiments, the proxy device 114 may generate and send a request for the indication of whether the corrective action was successful to the service provider environment 106 (e.g., to account data storage 132 via troubleshooting controller 138) before receiving the indication in response to the request.

Figure 5:
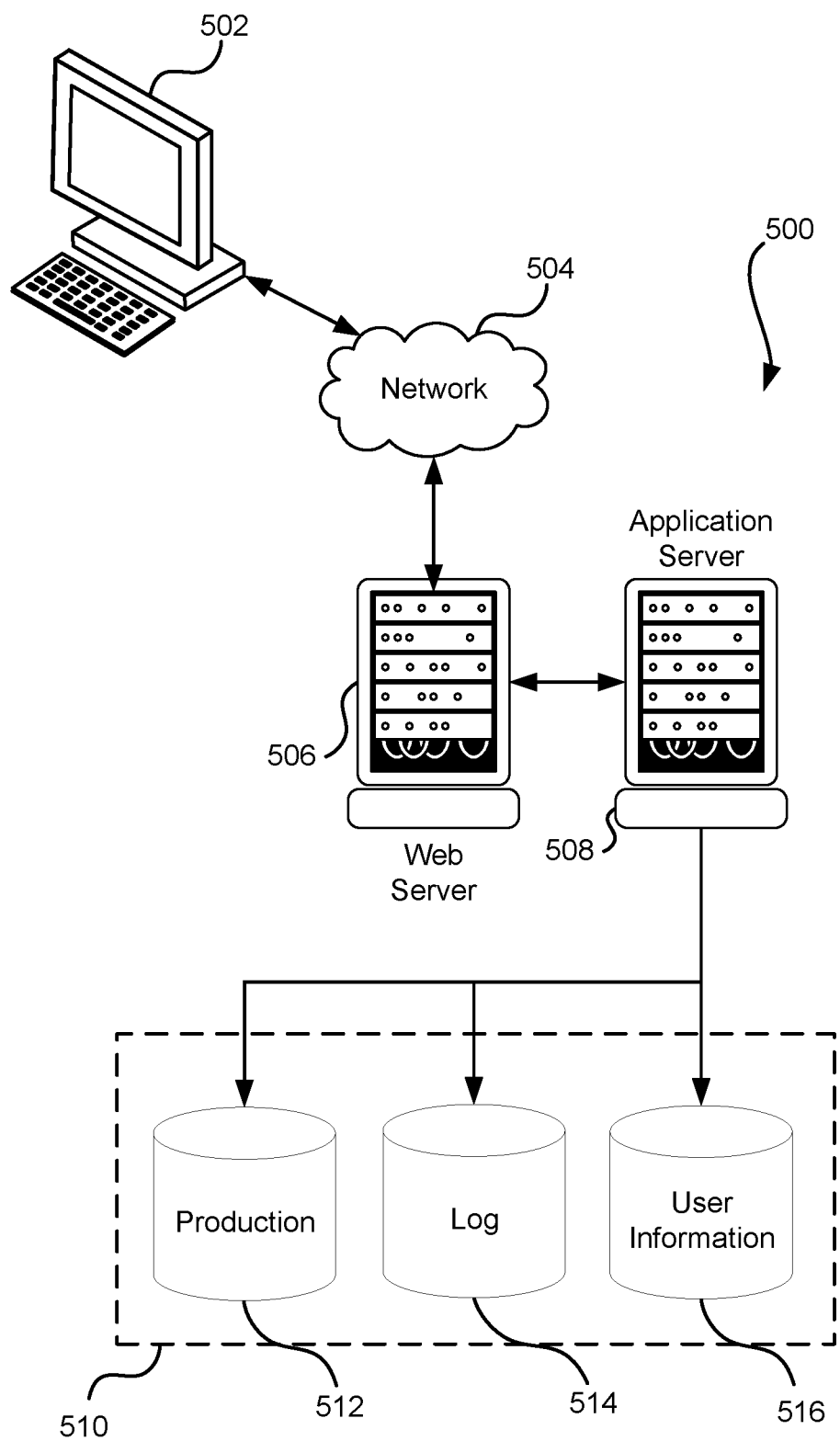
FIG. 5 illustrates a system in which various embodiments can be implemented.

FIG. 5 illustrates aspects of an example system 500 for implementing aspects in accordance with an embodiment. As will be appreciated, although a web-based system is used for purposes of explanation, different systems may be used, as appropriate, to implement various embodiments. In an embodiment, the system includes an electronic client device 502, which includes any appropriate device operable to send and/or receive requests, messages, or information over an appropriate network 504 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 506 for receiving requests and serving content in response thereto, although for other networks an alternative device serving a similar purpose could be used as would be apparent to one of ordinary skill in the art. In some embodiments, the client device may include one or more processors, memory, and one or more storage devices. In some embodiments, the client device 102 may implement one or more aspects of the device 102, the proxy device 114, the hub device 110, and/or the account holder 136 described with respect to FIG. 1, and/or aspects of the process 400 described with respect to FIG. 4.

In an embodiment, the illustrative system includes at least one application server 508 and a data store 510, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application. In some embodiments, one or more of the application servers 508 and/or one or more of the web servers 506 may implement one or more aspects of the message broker 116, the troubleshooting data processor 118, the troubleshooting controller 138, and/or the account interface 134 described with respect to FIG. 1, and/or aspects of the process 200 described with respect to FIG. 2 and the process 300 described with respect to FIG. 3. In some embodiments, the data store 510 may implement one or more aspects of the account data storage 132 and/or the inference model storage 140 described with respect to FIG. 1.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 502 and the application server 508, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 510, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 512 and user information 516, which are used to serve content for the production side. The data store also is shown to include a mechanism for storing log data 514, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 510.

The data store 510, in an embodiment, is operable, through logic associated therewith, to receive instructions from the application server 508 and obtain, update or otherwise process data in response thereto, and the application server 508 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 502. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 500 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 500, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 5. Thus, the depiction of the system 500 in FIG. 5 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C # or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising:
receiving a first log generated by a first device through a first channel;
storing the first log in association with a customer account in a data repository;
receiving a second log generated by the first device, the second log received from a second device through a second channel;
identifying the second log as being a log that requires further action based at least in part on an error identifier in the second log, the error identifier identifying a malfunction of the first device associated with the first channel;
associating the first log with the second log;
determining a corrective action to cause the first device to cease the malfunction, based at least in part on an inference model and the error identifier, wherein determining the corrective action includes determining an inference by using at least the error identifier from the second log and one or more data elements from the first log as inputs to the inference model; and
sending a message to the second device based at least in part on the corrective action.

2. The computer-implemented method of claim 1, wherein the first log is received in a Message Queuing Telemetry Transport (MQTT) transmission.

3. The computer-implemented method of claim 1, wherein the corrective action is to send a firmware update, and sending the message to the second device includes sending the firmware update to the first device via the second device.

4. The computer-implemented method of claim 1, further comprising selecting the inference model from a plurality of inference models, based at least in part on the second log.

5. The computer-implemented method of claim 1, further comprising:
storing the second log in the data repository based at least in part on a customer identifier, wherein the data repository is part of a computing environment;
providing an interface to provide selective access to a portion of the computing environment to an account holder associated with the customer identifier; and
receiving the inference model via the interface.

6. A system, comprising:
one or more processors; and
memory that stores computer-executable instructions that, in response to execution, cause the one or more processors to:

store a first log generated by a first device in association with a customer account in a data repository, the first log received through a first channel;

store a second log in association with the customer account in the data repository, the second log identifying an error associated with the first channel, the second log generated by the first device and received from a second device through a second channel;

determine a corrective action based at least in part on the second log and an inference model; and send data to the first device via the second device based at least in part on the corrective action.

7. The system of claim 6, wherein the memory further comprises instructions that, in response to execution, cause the one or more processors to associate the first log with the second log, and to determine the corrective action based at least in part on using an error identifier from the second log and one or more data elements from the first log as inputs to the inference model.

8. The system of claim 6, wherein the corrective action is to send a firmware update, and the memory further comprises instructions that, in response to execution, cause the one or more processors to send the firmware update to the first device via the second device.

9. The system of claim 6, wherein the corrective action is to send a digital certificate, and the memory further comprises instructions that, in response to execution, cause the one or more processors to send the digital certificate to the first device.

10. The system of claim 6, wherein the memory further comprises instructions that, in response to execution, cause the one or more processors to:
select the inference model from a plurality of inference models, based at least in part on the second log; and
determine the corrective action based at least in part on the selected inference model.

11. The system of claim 6, wherein the memory further comprises instructions that, in response to execution, cause the one or more processors to:
receive the second log in a Message Queuing Telemetry Transport (MQTT) message or a HyperText Transfer Protocol (HTTP) message;
parse the second log to extract an error identifier; and
determine the corrective action based at least in part on using the error identifier as an input to the inference model.

12. The system of claim 6, wherein the memory further comprises instructions that, in response to execution, cause the one or more processors to:
receive a third log generated by the first device, wherein the third log includes a sequence number that indicates the third log was generated after the second log; and
retrain the inference model based at least in part on the corrective action and the third log.

13. The system of claim 6, wherein the data repository is part of a computing environment and the memory further comprises instructions that, in response to execution, cause the one or more processors to:
provide an interface to provide selective access to a portion of the computing environment to an account holder associated with the customer account;
receive the inference model via the interface;
store the inference model in the data repository; and
retrieve the stored inference model to determine the corrective action.

14. A non-transitory computer-readable storage medium storing thereon executable instructions that, as a result of being executed by one or more processors of a first computer system, cause the first computer system to at least:
receive, via a first communication link with a device running a real-time operating system, a log, generated by the device, that includes an error identifier that identifies a connectivity error associated with a second communication link between the device and a second computer system;
determine a corrective action based at least in part on using the error identifier of the log and a device state indicator as inputs to an inference model, wherein the device state indicator indicates a firmware version running on the device when the log was generated; and
send data to the device based at least in part on the corrective action.

15. The non-transitory computer-readable storage medium of claim 14, wherein the log is a first log that identifies a first error, and the non-transitory computer-readable storage medium further comprises instructions that, as a result of being executed by the one or more processors, cause the first computer system to at least:
receive, via the communication link with the device, a second log that identifies a second error generated by the device;
determine, based at least in part on the second log, to send one or more portions of the second log to a third computer system for analysis;
send the one or more portions of the second log to the third computer system; and
receive data corresponding to a corrective action from the third computer system, in response to the sent one or more portions of the second log.

16. The non-transitory computer-readable storage medium of claim 15, wherein the first communication link is a wireless communication link, the received data is a firmware update for the device, and the non-transitory computer-readable storage medium further comprises instructions that, as a result of being executed by the one or more processors, cause the first computer system to transmit the firmware update to the device over the wireless communication link.

17. The non-transitory computer-readable storage medium of claim 15, further comprising instructions that, as a result of being executed by the one or more processors, cause the first computer system to send an authentication request to the third computer system and receive an authentication confirmation from the third computer system in response to the authentication request, wherein the first computer system is to send the one or more portions of the second log based at least in part on the authentication confirmation.

18. The non-transitory computer-readable storage medium of claim 14, wherein the first computer system is included in a mobile communications device and the first communications link is a Bluetooth Low Energy communications link.

* * * * *